US012496608B2

(12) United States Patent
Walter et al.

(10) Patent No.: US 12,496,608 B2
(45) Date of Patent: Dec. 16, 2025

(54) VALVE ARRANGEMENT

(71) Applicant: Focke & Co. (GmbH & Co. KG), Verden (DE)

(72) Inventors: Jan-Christian Walter, Bardowick (DE); Martin Eilts, Neu Wulmstorf (DE)

(73) Assignee: Focke & Co. (GmbH & Co. KG), Verden (DE)

(*) Notice: Subject to any disclaimer, the term of this patent is extended or adjusted under 35 U.S.C. 154(b) by 324 days.

(21) Appl. No.: 18/003,525

(22) PCT Filed: Jul. 2, 2021

(86) PCT No.: PCT/EP2021/068370
§ 371 (c)(1),
(2) Date: Dec. 28, 2022

(87) PCT Pub. No.: WO2022/003171
PCT Pub. Date: Jan. 6, 2022

(65) Prior Publication Data

US 2023/0271215 A1 Aug. 31, 2023

(30) Foreign Application Priority Data

Jul. 3, 2020 (DE) ..................... 10 2020 117 617.1

(51) Int. Cl.
*B05B 15/65* (2018.01)
*B05C 5/02* (2006.01)

(52) U.S. Cl.
CPC ............ *B05B 15/65* (2018.02); *B05C 5/0275* (2013.01)

(58) Field of Classification Search
CPC ......... B05B 15/65; B05B 7/08; B05B 7/0807; B05C 5/027; B05C 5/0275

(Continued)

(56) References Cited

U.S. PATENT DOCUMENTS 6,378,784 B1 * 4/2002 Allen ...................... B05C 5/027 239/296
6,619,566 B2 * 9/2003 Gressett, Jr. ............ B05C 5/027 239/296

(Continued)

FOREIGN PATENT DOCUMENTS

CN 1378884 A 11/2002
DE 202004007024 U1 7/2004

(Continued)

OTHER PUBLICATIONS

WIPO, International Search Report (in parent application), Oct. 5, 2021.

(Continued)

*Primary Examiner* — Steven J Ganey
(74) *Attorney, Agent, or Firm* — Laurence P. Colton; Smith Tempel Blaha LLC

(57) ABSTRACT

A valve arrangement for applying flowable medium to a substrate, having a main valve body with a medium channel for flowable media which is able to be closed by a movable closure member and to which a nozzle part having a nozzle opening of the valve arrangement is connected, wherein the valve arrangement has a pivotable lever movable out of a fastening position and into a releasing position, wherein the pivotable lever, during the movement from the fastening position into the releasing position, exerts a detaching force on the nozzle part in order to support the detachment of the nozzle part from the main valve body. In a first phase of its movement out of the fastening position and into the releasing position, the lever is movable in a straight line and exerts the detaching force on a push-off surface of the nozzle part, and entrains the nozzle part.

20 Claims, 7 Drawing Sheets

(58) Field of Classification Search
USPC ................................. 239/296, 390, 566, 600
See application file for complete search history.

(56) References Cited

U.S. PATENT DOCUMENTS

| | | | | |
|---|---|---|---|---|
| 7,399,361 | B2 * | 7/2008 | de Leeuw | B05C 5/02 239/600 |
| 8,695,894 | B2 * | 4/2014 | Gressett, Jr. | B05B 7/0861 239/296 |
| 9,724,722 | B2 | 8/2017 | Lessly | |
| 10,124,362 | B2 * | 11/2018 | Saine | D06B 15/09 |
| 2005/0274317 | A1 | 12/2005 | de Leeuw et al. | |
| 2015/0352588 | A1 | 12/2015 | Lessley et al. | |
| 2016/0339470 | A1 | 11/2016 | MacIndoe | |

FOREIGN PATENT DOCUMENTS

| | | | |
|---|---|---|---|
| EP | 1243342 | A2 | 9/2002 |
| EP | 2143501 | A1 | 1/2010 |
| EP | 1243342 | B9 | 2/2010 |

OTHER PUBLICATIONS

Deutsches Patent—Und Markenamt (German Patent and Trademark Office), Recherchebericht (search in a related application), Apr. 12, 2021.

China National Intellectual Property Administration, Notification of the First Office Action (in a corresponding application), Jun. 14, 2025.

* cited by examiner

VALVE ARRANGEMENT

CROSS REFERENCE TO RELATED APPLICATIONS

This application is the US national phase of and claims the benefit of and priority on International Application No. PCT/EP2021/068370 having an international filing date of 2 Jul. 2021, which claims priority on and the benefit of German Patent Application No. 10 2020 117 617.1 having a filing date of 3 Jul. 2020.

BACKGROUND OF THE INVENTION

Technical Field

The present invention relates to a valve arrangement for applying flowable medium to a substrate, in particular for applying hot glue, having a main valve body with at least one medium channel for flowable media which is able to be closed by a movable closure member and to which at least one nozzle part having a nozzle opening of the valve arrangement is connected, which nozzle part is fastened releasably to the main valve body and via which nozzle part the portions of the flowable medium can be dispensed onto a substrate, wherein the valve arrangement, for releasably fastening the nozzle part to the main valve body, has a pivotable lever, fastened in particular to the main valve body, of a fastening device fastened in particular to the main valve body, by means of which lever the nozzle part is able to pressed against the main valve body in a fastening position by application of a pressing force, wherein the pivotable lever is movable out of the fastening position and into a releasing position, in which it does not exert a pressing force and in which the nozzle part is removable from the main valve body, wherein the fastening device, in particular the pivotable lever of the latter, and the nozzle part are configured and cooperate in such a way that the pivotable lever, during the movement from the fastening position into the releasing position, exerts a detaching force, directed away from the main valve body, on the nozzle part in order to support the detachment of the nozzle part from the main valve body. The invention also relates to a nozzle part for such a valve arrangement.

Prior Art

One embodiment of EP 1 243 342 B9 shows such a valve arrangement. It makes it possible to exchange the respective nozzle part and to insert for example one with a different application pattern. In that document, it easier to detach the nozzle part from the main valve body using the pivotable lever of the fastening device if, for example, when use is made of liquid adhesive, in particular hot melt, adhesions occur between the nozzle part and the main valve body. A user then moves a fastening screw which is arranged next to the nozzle part and the movement of which then brings about pivoting of the lever, exerting the detaching force on the nozzle part.

A drawback of the solution in EP 1 243 342 B9 is, inter alia, that on account of the design, the detaching forces (torques) that are transmissible when the lever is pivoted are not particularly large, in particular on account of the low effective lever length. Furthermore, the fastening screw is arranged very close to the lever with which the detaching forces are applied, which generally becomes very hot during operation, in particular when hot glue is used, with the result that there is the risk of the user suffering burns.

BRIEF SUMMARY OF THE INVENTION

Proceeding from this prior art, it is an object of the present invention to further develop the valve arrangement of the type mentioned at the beginning.

This object is achieved by a valve arrangement for applying flowable medium to a substrate, in particular for applying hot glue, having a main valve body with at least one medium channel for flowable media which is able to be closed by a movable closure member and to which at least one nozzle part having a nozzle opening of the valve arrangement is connected, which nozzle part is fastened releasably to the main valve body and via which nozzle part the portions of the flowable medium can be dispensed onto a substrate, wherein the valve arrangement, for releasably fastening the nozzle part to the main valve body, has a pivotable lever, fastened in particular to the main valve body, of a fastening device fastened in particular to the main valve body, by means of which lever the nozzle part is able to pressed against the main valve body in a fastening position by application of a pressing force, wherein the pivotable lever is movable out of the fastening position and into a releasing position, in which it does not exert a pressing force and in which the nozzle part is removable from the main valve body, wherein the fastening device, in particular the pivotable lever of the latter, and the nozzle part are configured and cooperate in such a way that the pivotable lever, during the movement from the fastening position into the releasing position, exerts a detaching force, directed away from the main valve body, on the nozzle part in order to support the detachment of the nozzle part from the main valve body, characterized in that, in a first phase of its movement out of the fastening position and into the releasing position, the lever is movable in a straight line and in the process exerts the detaching force on the nozzle part, in particular on a push-off surface of the nozzle part, and entrains the nozzle part and by a nozzle part for such an arrangement.

According thereto, the valve arrangement is characterized according to the invention in that, in a first phase of its movement out of the fastening position and into the releasing position, the lever is movable in a straight line and in the process exerts the detaching force on the nozzle part, in particular on a push-off surface of the nozzle part, and entrains the nozzle part.

Since, according to the invention, the pivotable lever for applying the detaching part is not—as in the prior art—pivoted, but is moved linearly, it is possible, inter alia, to exert particularly large detaching forces. In addition, linear movability of the lever allows a movable operating part of the fastening device, for instance a screw, to be arranged at a relatively large distance from that lever portion that transmits the detaching force.

According to the invention, provision may be made, inter alia, to arrange on the main valve body only one such releasable nozzle part with accordingly only one fastening device, assigned thereto, with a pivotable lever etc., wherein the nozzle part may be in the form, inter alia, of a (standard) nozzle for applying individual medium portions, medium spots or narrow medium strips, but may also be in the form of a flat-film die.

However, provision may also be made for a plurality of such releasable nozzle parts to be arranged on a (common)

main valve body (in the form of a distributor), wherein each nozzle part is then assigned a respective fastening device with a pivotable lever etc.

As far as the movement of the lever is concerned, in the first phase of its movement, said lever is movable perpendicularly to a plane or the plane in which the nozzle opening of the nozzle part extends (before the detaching force is exerted, i.e., in the fastened, operational state), in particular downwardly.

According to the invention, in a second phase of its movement, in particular following the first movement phase, the lever may be movable in particular to the side into the releasing position by a pivoting movement (guided along a predetermined movement curve) brought about in particular by the restoring forces of a spring of the fastening device. In this case, the pivoting movement of the pivotable lever would accordingly be provided to transfer the lever into the releasing position, while the linear movement of the lever ensures that the nozzle part is detached.

Conversely, during a return movement of the pivotable lever from the releasing position into the fastening position, a first return-movement phase could/would moreover take place, in which the lever is pivoted in the opposite direction of movement to the second movement phase. In a second return-movement phase following in particular the first return-movement phase, the lever could/would then be moved linearly in the opposite direction to the first movement phase until the lever is in the fastening position and applies the pressing force to the sealing part.

According to a preferred development of the invention, in the fastening position, the nozzle part is clamped between the lever and a counter bearing, which is in particular positionally fixed and is arranged preferably on the main valve body, in particular fastened thereto. This clamping may take place with the nozzle part being centered such that a medium channel of the nozzle part, which leads to the nozzle opening, is aligned with the medium channel of the main valve body.

The nozzle part may have a clamping surface against which the lever presses in the fastening position in order to transmit the pressing force to the nozzle part, and an in particular opposite push-off surface against which the lever presses at least temporarily during its movement into the releasing position, in order to transmit the detaching force to the nozzle part.

Furthermore, the nozzle part may have an in particular V-shaped (lateral) recess or an in particular V-shaped (lateral) protrusion, in which, in the fastening position of the lever, a matching protrusion of the lever engages (when the nozzle part has the recess), or, respectively, which, in the fastening position of the lever, engages in a matching, in particular V-shaped recess in the lever (when the nozzle part has the protrusion), wherein the recess or the protrusion of the nozzle part is delimited in the direction of the main valve body or upwardly by the clamping surface and in the opposite direction or downwardly by the push-off surface.

As far as the counter bearing is concerned, it may have an in particular V-shaped protrusion which, in the fastening position of the lever, in which the nozzle part is clamped between the lever and the counter bearing, engages in a matching, in particular V-shaped recess in the nozzle part. Alternatively, provision may also be made for the nozzle part to have such a protrusion, which would then engage in a corresponding recess in the counter bearing.

As far as the lever is concerned, it may have a perpendicular portion which is arranged in a plane that extends perpendicularly to a plane in which the nozzle opening of the nozzle part extends (before the detaching force is exerted), in particular in a vertical plane, and/or an oblique portion which is arranged in a plane that extends obliquely to this plane.

The oblique portion of the lever may adjoin an end portion, comprising a free end, of the lever, which presses against the clamping surface of the nozzle part in the fastening position and which presses temporarily against the push-off surface of the nozzle part during the movement of the lever into the releasing position.

The lever, in particular the perpendicular portion thereof, may be guided laterally against a guide of the valve arrangement during the straight movement of the first movement phase. In particular against a guide which is arranged above the nozzle part and/or against a side of the main valve body which is arranged in a plane that extends perpendicularly to the plane in which the nozzle opening of the nozzle part extends (before the detaching force is exerted).

As far as the fastening device is concerned, it may preferably be in the form of a tensioning device with which the lever, in the fastening position, is able to be pressed under preload—with application of the pressing force—against the nozzle part.

The tensioning device may comprise a tensioning screw which is coupled to the lever and is supported in particular on a positionally fixed supporting face connected to the main valve body, wherein a first rotational movement of the tensioning screw brings about the straight, preferably downwardly directed movement of the first movement phase of the lever.

A second rotational movement, in particular following the first rotational movement, of the tensioning screw may initiate the pivoting movement of the second movement phase of the lever.

As far as the abovementioned guide is concerned, it may have a first guide surface against which a first lever guide surface, which is assigned to a first side of the perpendicular portion of the lever, is guided during the straight movement, brought about by the first rotational movement of the tensioning screw, of the first movement phase.

The guide may furthermore have a second guide surface which is formed by one side of the spring, in the form of a spring sheet, of the fastening device, against which a second lever guide surface, which is assigned to a second side of the perpendicular portion of the lever, is guided during the straight movement, brought about by the first rotational movement of the tensioning screw, of the first movement phase, and the restoring forces of which in the process act on the second lever guide surface and as a result press the first lever guide surface against the first guide surface of the guide.

Preferably, provision may also be made that, during the second rotational movement of the tensioning screw, the first lever guide surface is moved out beyond one end of the first guide surface of the guide, such that the first lever guide surface is no longer pressed against the first guide surface of the guide, and such that—owing to the cessation of the opposing forces, opposing the restoring forces, of the first guide face—the restoring forces, acting on the second lever guide surface, of the spring sheet (may) bring about the pivoting movement of the second movement phase of the lever.

In this case, provision may be made for the perpendicular portion of the lever to have a stop surface which is assigned to the first side of the perpendicular portion, in particular is formed thereby, and is set back laterally with respect to the first lever guide surface, said stop surface butting against a guide surface of the guide, in particular against the first guide surface of the guide, at the end of the pivoting movement.

According to a further embodiment of the invention, provision may be made for the fastening device to press the lever, in the fastening position, against the nozzle part with specific elastic deformation of the lever with preload, such that, on account of the preload of the lever, the pressing force remains substantially the same, or differs from the initial pressing force by no more than 20%, preferably no more than 30%, even in the case of temperature-related, different expansion of the materials of the lever, of the nozzle part and/or of the main valve body and thus otherwise associated easing of the pressing force.

BRIEF DESCRIPTION OF THE DRAWINGS

Further features of the present invention will become apparent from the appended patent claims, from the following description of preferred exemplary embodiments and from the appended drawings, in which:

DETAILED DESCRIPTION OF PREFERRED EMBODIMENTS

Figure 1:
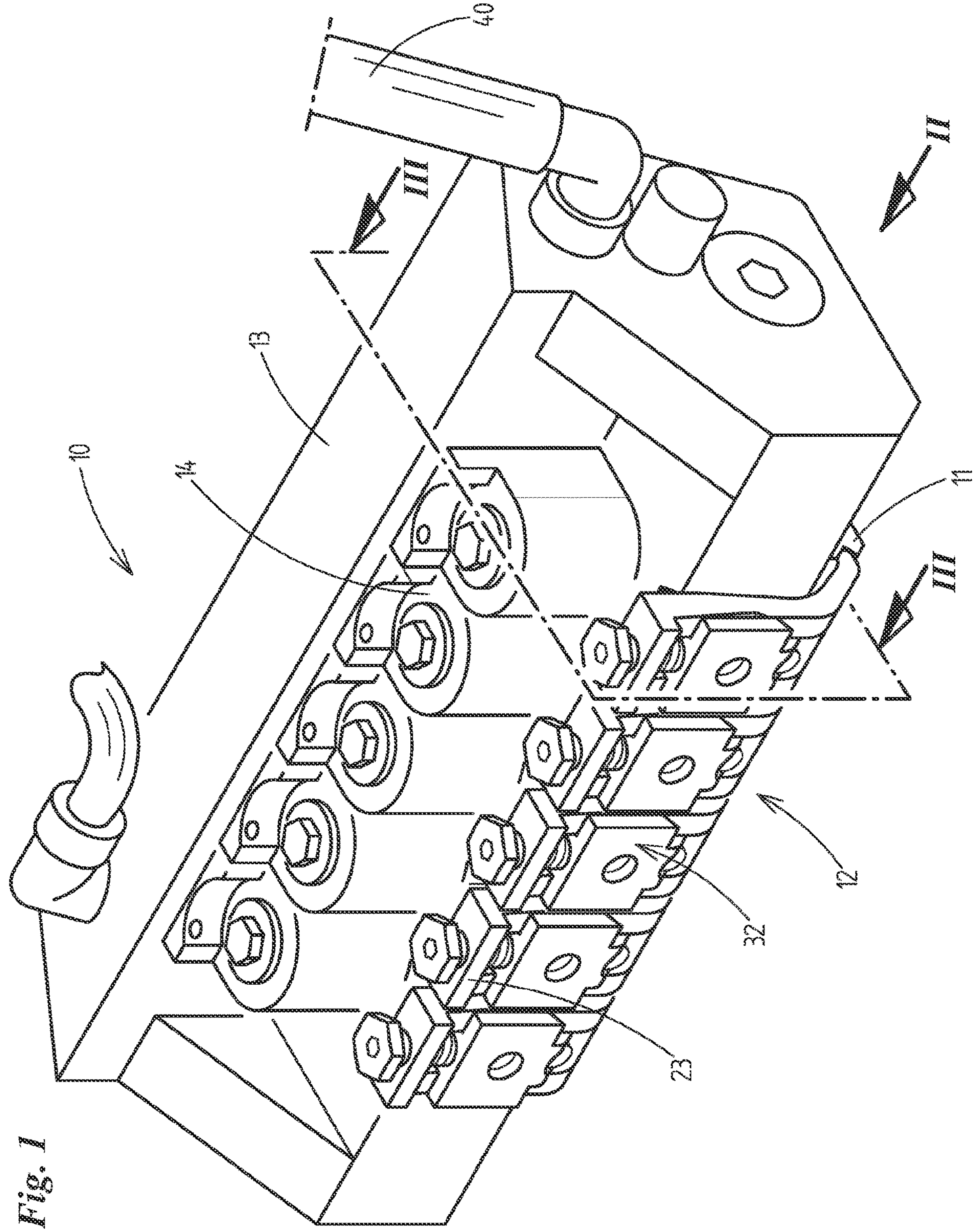
FIG. 1 shows an oblique view of a valve arrangement according to the invention having a main valve body with a plurality of nozzle parts fastened releasably thereto, wherein the fastening takes place in each case by way of an associated fastening device having a lever.

The valve arrangement 10, illustrated in the drawings, for applying flowable medium (in particular portions/strips etc. of a flowable medium) to a substrate, in particular hot glue, comprises a plurality of nozzles or nozzle parts 11 that are each attached to a medium channel 16 of a main valve body 13 and are each fastened to the (common) main valve body 12 by a separate fastening device 12.

In the present case, the main valve body 13 comprises a plurality of separate valve units 14, which each have, inter alia, a closure member (not shown) which is movable between an open position and closed position and with which the dispensing of flowable medium, for example (hot melt) liquid adhesive, out of terminal (lower) nozzle openings 15 of the nozzle parts 11 can be controlled. From the nozzle openings 15, the medium then flows/drops onto a substrate (not shown) or is transferred onto the latter; for instance onto material blanks or continuous material webs for the production of cigarette packs, made for example of paper, cardboard or film.

It goes without saying that the main valve body may alternatively comprise for example only one valve unit with, accordingly, generally only one nozzle part fastened thereto.

The closure members are generally controlled electromagnetically or in some other way. For example, in that they can be kept in the closed position by the restoring force of a spring or by permanent magnets and can be moved cyclically from the closed position into the open position by the opposing force of a controllable electromagnet. Such valve units 14, and those based on other operating principles, having a movable closure member are comprehensively known from the prior art.

The respective flowable medium is fed to the main valve body 13 via a medium feed line 40. In the main valve body 13, the flowable medium is conveyed and/or distributed, in particular to the valve units 14 of the main valve body, via a corresponding medium channel system comprising the medium channel/channels.

The individual nozzle parts 11 each adjoin a lower end 17 of the respective medium channel 16.

Specifically such that a corresponding terminal inlet opening 18 of a nozzle part (medium) channel 20 of the nozzle part 11 is brought into congruence with a terminal outlet opening 19 (arranged at the lower end 17) of the medium channel 16, or such that the medium channel 16 of the main valve body 13 is aligned, in the region of its outlet opening 19, with the nozzle part channel 20 of the nozzle part 11 in the region of its inlet opening 18.

The respective nozzle part/the respective nozzle 11 is functionally configured such that it influences, in a known way, the dispensing of the flowable medium or of medium portions from the valve arrangement 10 into the free space or onto the substrate. Specifically, in particular, via the shape and the course of the nozzle part channel 20 and the shape of the nozzle opening 15.

Figure 2:
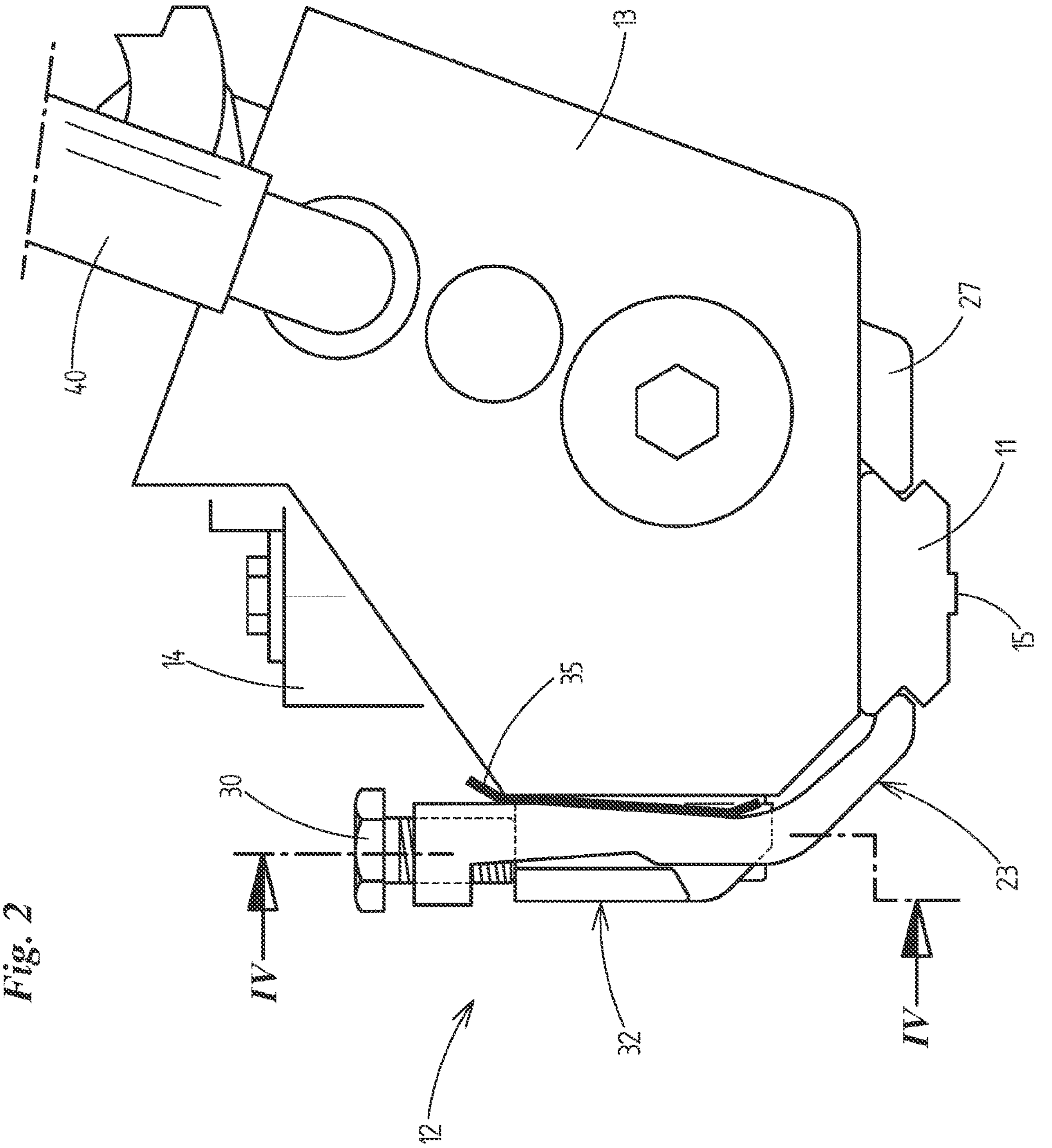
FIG. 2 shows a side view of the valve arrangement from FIG. 1 from the viewing direction II in FIG. 1.
Figure 4:
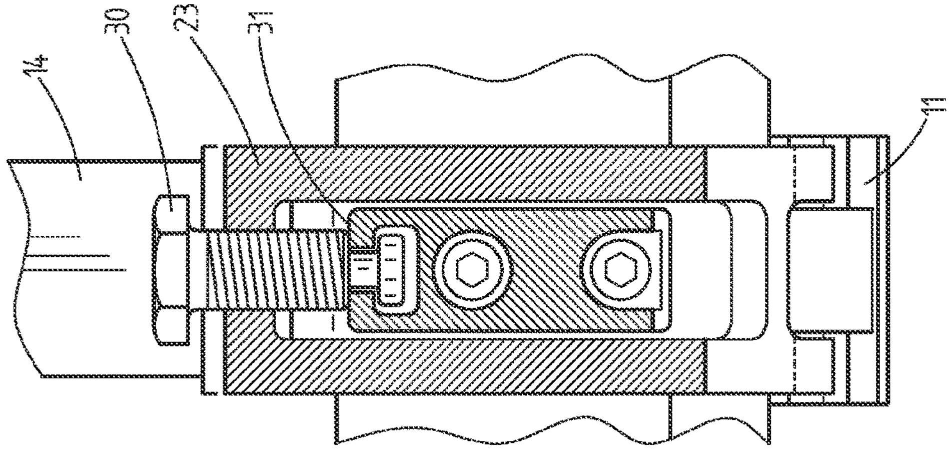
FIG. 4 shows a section along the section line IV-IV in FIG. 2.
Figure 3:
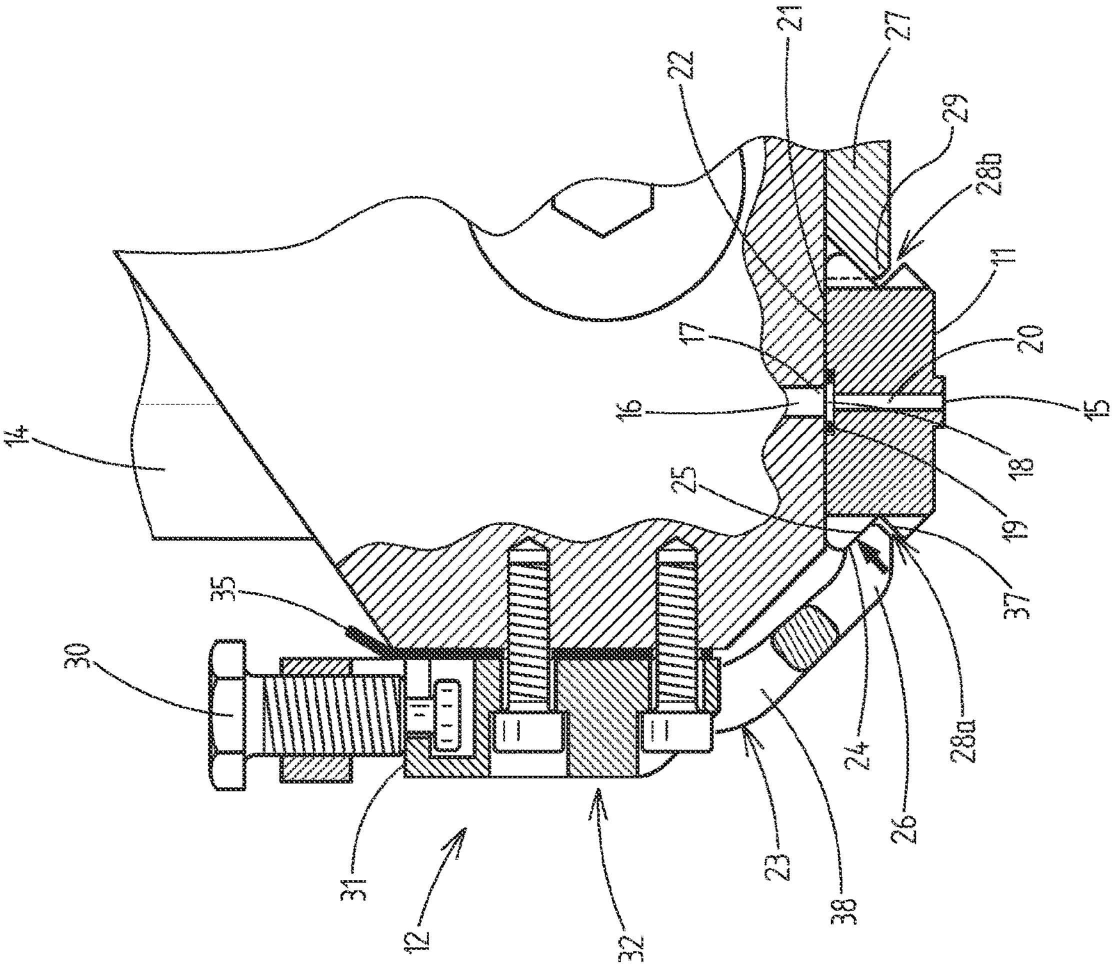
FIG. 3 shows a section through the valve arrangement along the section plane III in FIG. 1.
Figure 7:
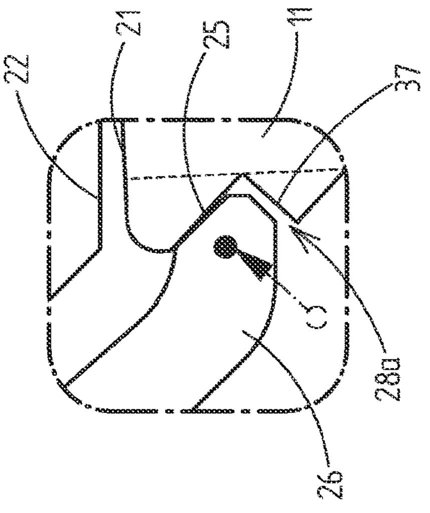
FIG. 7 shows the detail VII from FIG. 6 in an enlarged illustration.

During operation of the valve arrangement 10, the nozzle parts 11 are fastened to the valve arrangement 10 in the manner shown for example in FIG. 2. In this state, an (upper, horizontal) contact surface 21, which is arranged parallel to the plane in which the nozzle opening 15 extends—referred to as the nozzle opening plane in the following text—bears against a corresponding (lower, horizontal) mating surface 22 of the main valve body 13. The mating surface 22 is also arranged so as to extend in a (horizontal) plane parallel to the nozzle opening plane.

During operation or after operation of the valve arrangement 10, it may then be necessary or desirable to change one or more nozzle parts 11. For example because these have been damaged or because nozzle parts with different dispensing characteristics are intended to be used, with which accordingly different quantities, sizes, shapes etc. of medium or of medium portions can be dispensed.

For this purpose, the nozzle parts 11 are arranged in each case so as to be releasable in a particular way, with the aid of the fastening devices 12 that are settable or operable by a user, such that said nozzle parts 11 are each removable from the main valve body 13.

Figure 5:
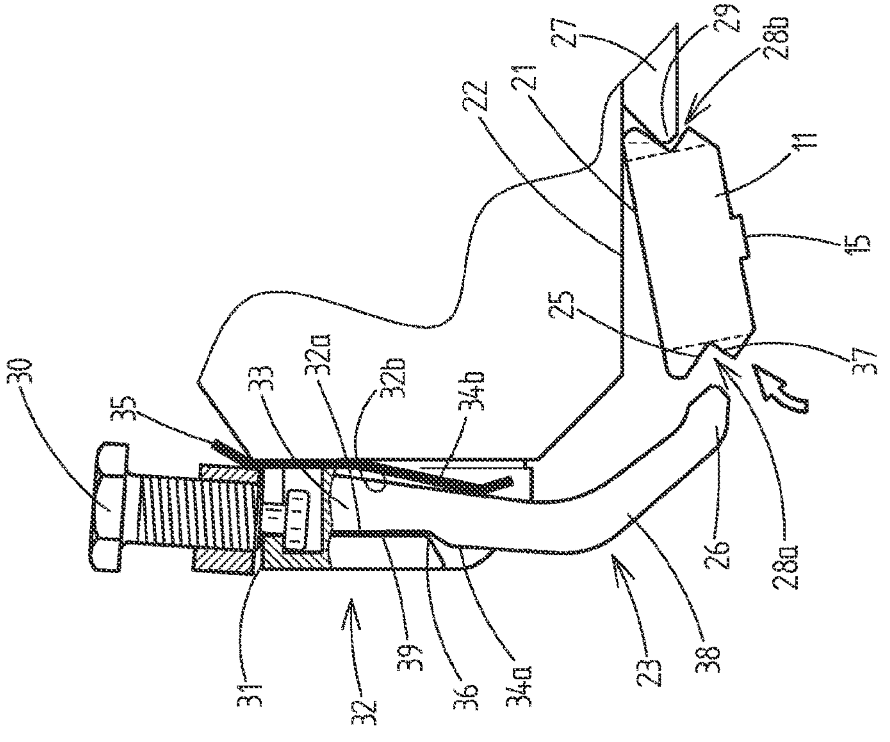
FIG. 5 shows a partial detail of the view in FIG. 2 with an open lever, or a lever in the releasing position.
Figure 9:
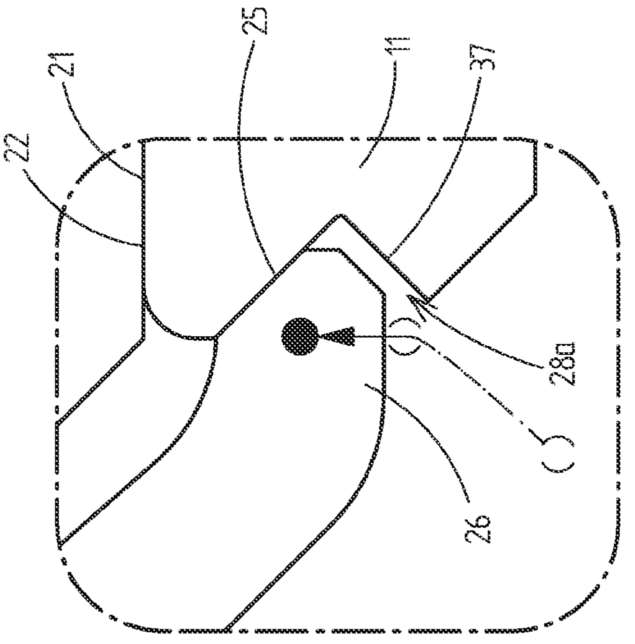
FIG. 9 shows the detail IX from FIG. 8 in an enlarged illustration.

In this case, the respective fastening device 12 is transferable from a fastening state, in which it retains the respective nozzle part 11 on the main valve body 13, cf. for example FIG. 2, into a releasing state, in which the nozzle part 11 can be released from the main valve body 13, cf. for example FIG. 5.

The respective fastening device 12 has, for this purpose, as a particularly important component, a pivotable lever 23, which can accordingly be moved from a fastening position into a releasing position (and vice versa).

In this case, the nozzle part 11 is clamped, in the fastened state, between a free end portion 26 of the lever 23 and a (positionally fixed) counter bearing 27 located opposite and at a distance from the latter and arranged on the main valve body 13.

In its fastening position, the lever 23 applies an (upwardly acting) pressing force on the clamped nozzle part 11 and presses the latter accordingly against the mating surface 22 of the main valve body 13, with the nozzle part 11 being centered.

In order to transmit the pressing force to the nozzle part 11, the lever 23 has a pressure surface 24 which extends obliquely to the nozzle opening plane and, in the fastened state of the lever 23, presses or is pressed under preload against an opposite clamping surface, which extends parallel or likewise obliquely to the nozzle opening plane, of the nozzle part 11.

In the present exemplary embodiment, the respective nozzle part 11 specifically has, on opposite sides, a respective (in the present case V-shaped) recess 28*a* and 28*b*, respectively.

An (in the present case V-shaped) protrusion 29 of the counter bearing 27 that matches the recess 28*b* in terms of its shape and dimensions engages in the recess 28*b*.

In a corresponding manner, the (in the present case likewise V-shaped) end portion 26, in the form of a protrusion, of the lever 23 engages in the recess 28*a* that the clamping surface 25 comprises.

The design of the respective recess 28*a*, 28*b* in the nozzle part 11 and of the respective protrusion/end portion 26 and 29, respectively, may of course also have a different shape. It is for example also conceivable for the assignment of recess/matching protrusion to the counter bearing 27 and to the end portion 26 of the lever, for the one part, and to the nozzle part 11, for the other part, also to be switched, such that the nozzle part 11 has one or both protrusions and the counter bearing 27, or the end portion 26, accordingly has the matching recess.

In any case, it is particularly advantageous when, as already indicated, one/the pressure surface 24 of the end portion 26 of the lever 32 and/or the clamping surface 25 of the nozzle part 11 extend obliquely, in particular obliquely to the nozzle opening plane (or to the horizontal/vertical), in order to be able to transmit the corresponding forces particularly effectively.

The fastening device 12 is in the form of a tensioning device that is settable in terms of its force application or preload application by means of a movable operating part, specifically in the present case a tensioning screw 30, in order, in the fastening position of the lever 23 or in the fastened state of the nozzle part 11, to press the nozzle part 11 against the main valve body 13 with a specifically set preload.

In the process, in the present case, a specific elastic deformation of the lever 23, which accordingly consists of a suitably elastically deformable material, such as a suitable steel, takes place as a result of the setting of a sufficient tensioning force by means of the tensioning screw 30, such that the pressing force, on account of the preload of the lever 23, remains substantially the same, or differs from the initial pressing force by at least no more than 20% or preferably no more than 30%, even in the case of temperature-related, possibly different expansion of the materials of the lever 23, of the nozzle part 11 and possibly of the main valve body 13, and thus otherwise associated easing of the pressing force.

The lever 23 of the fastening device 12 is coupled (in an upper region) to the tensioning screw 30. In the present case, the tensioning screw 30 is screwed into a through-hole thread, arranged in an (upper) portion of the lever, of the lever 23 and is supported at a free end on the other side of the through-hole thread on or against a positionally fixed supporting surface 31 connected to the main valve body.

In this case, as is explained in more detail in the following text, the supporting surface 21 is part of a (positionally fixed) guide 32 for the lever 23, which is arranged on an (in the present case vertical) side of the main valve body that extends perpendicularly to the nozzle opening plane.

As a result of the tensioning screw 30 being actuated, the lever 23 can be moved from the fastening position shown in FIG. 2, in which, with application of the pressing force, it presses the nozzle part 11 against the main valve body 13, into the releasing position shown for example in FIG. 5, wherein the lever 23 in the process is first of all moved, in a first movement phase, in a straight line perpendicularly to the nozzle opening plane (downwardly) into an intermediate position and subsequently, in a second movement phase, is pivoted to the side from the intermediate position into the actual releasing position.

Figure 10:
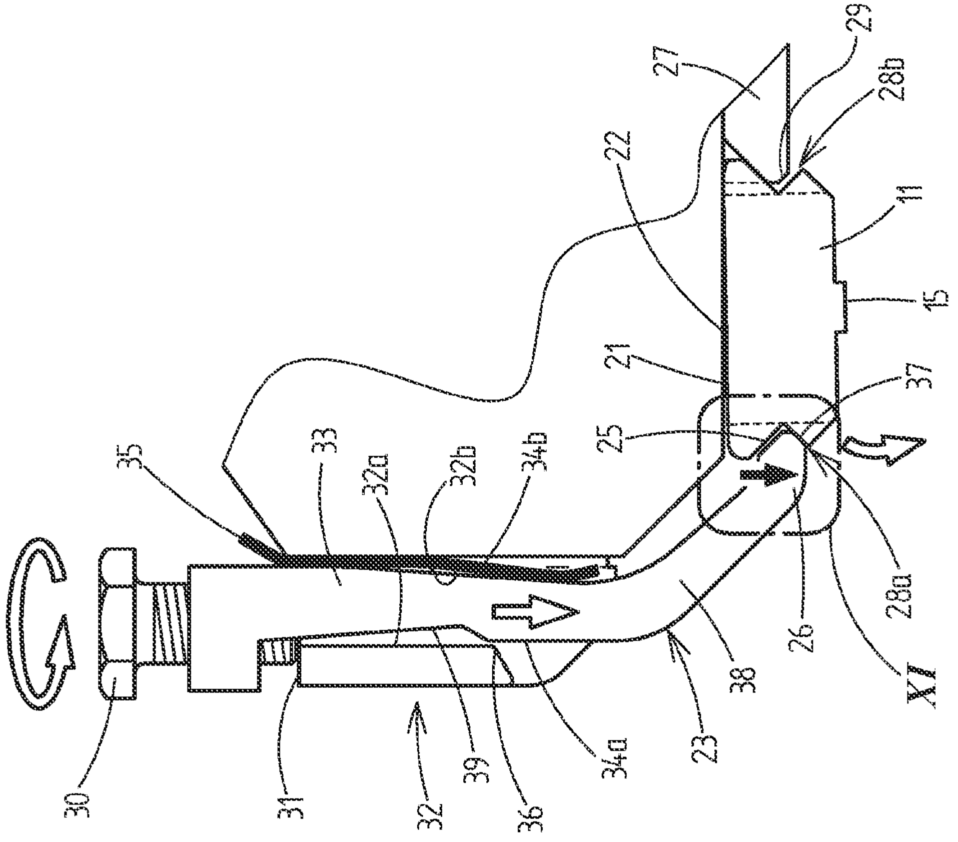
FIG. 10 shows an illustration corresponding to FIG. 8 after a first phase of the movement of the lever from the fastening position in FIG. 8 into the releasing position, specifically a straight movement.
Figure 13:
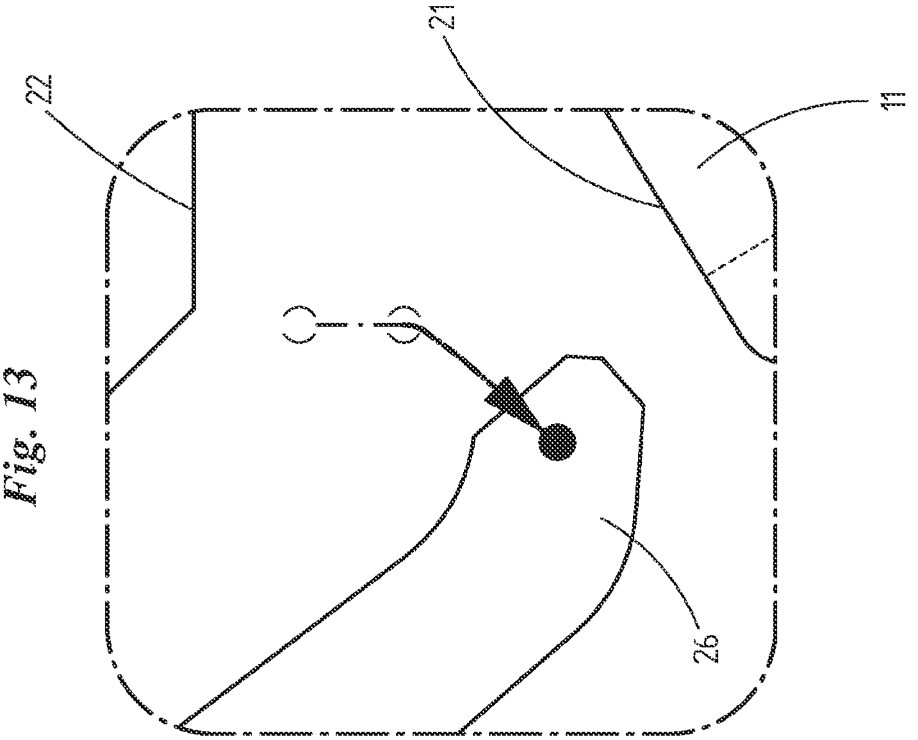
FIG. 13 shows the detail XIII from FIG. 12 in an enlarged illustration.

During the straight movement of the lever 23, cf. FIG. 10, the free end portion 26 of the lever 23 exerts a detaching force on a push-off surface 37 of the nozzle part 11 and thus on the entire nozzle part 11, such that a lever force detaching the nozzle part 11 arises since the opposite side of the nozzle part 11 is initially still engaged with the counter bearing 27 during the application of the detaching force.

This linear or straight movement downward is brought about by rotation of the tensioning screw 30 in a first direction of rotation, cf. the corresponding direction arrow in FIG. 10.

During the downward movement, the lever 23, specifically a portion 33 thereof that extends perpendicularly to the nozzle opening plane and is connected to the end portion 26 of the lever 23 via a portion 38 extending obliquely to the nozzle opening plane, is guided laterally against the guide 32.

For this purpose, the guide 32 has a first (lateral) guide surface 32*a* (arranged in particular in a vertical plane), against which a first lever guide surface 34*a* of the perpendicular portion 33 of the lever 23 is guided.

This first lever guide surface 34*a* is assigned to a first side, facing the guide surface 32*a*, of the perpendicular portion 33. In the present case, it is formed by this first side of the perpendicular portion 33 or by a limited region thereof.

A second lever guide surface 34*b* of the perpendicular portion 33 of the lever 23 is assigned to a second, opposite side of the perpendicular portion 33 (it is formed in the present case by said side or by a region thereof) and is guided against a second guide surface 32*b* of the guide 32, which is in turn formed by a spring sheet 35 which is supported on an (in the present case vertical) side of the main valve body 13 that extends perpendicularly to the nozzle opening plane.

The perpendicular portion 33 of the lever 23, or the lever guide surfaces 34*a* and 34*b* thereof, is/are clamped (in place), in the first movement phase of the lever 23, between the respective facing guide surfaces 32*a* and 32*b* of the guide, with the restoring forces of the spring sheet 35 being overcome.

Upon further movement of the tensioning screw 30 in the first direction of rotation shown in FIG. 10, the lever 23 is then transferred into the second movement phase, in which it is pivoted to the side in to the releasing position, such that the free end portion 26 of the lever 23 no longer engages in the recess 28*a* in the nozzle part 11, the latter is accordingly no longer clamped between the lever 23 and the counter bearing 27 and is accordingly removable from the main valve body 23.

This pivoting movement is first of all allowed in that, during this further rotational movement of the tensioning screw 30, the first lever guide surface 34*a* is moved (downward) beyond a (lower) free end 36 of the guide surface 32*a* of the guide (32), such that it can disengage or the first lever guide surface 32*a* is no longer/can no longer be pressed against the guide surface 32*a*.

Furthermore, that side of the perpendicular portion 33 of the lever 23 that forms the first lever guide surface 34*a* of the perpendicular portion 33 is formed in a manner set back to the side in a region on the other side of or above the lever guide surface 34*a*, specifically a stop region 39, with a lateral distance from the guide surface 32*a* of the guide 32 being formed relative to the first lever guide surface 34

As soon as the lever guide surface 34*a* is then moved beyond the free end 36 of the guide 32, lateral pivoting of the perpendicular portion 33 subjected to the restoring forces of the spring sheet 35 and, together therewith, of the entire lever 23 takes place (automatically), since the perpendicular portion 33 at this moment is no longer supported against the guide surface 32*a* by the first lever guide surface 34*a* and the restoring forces accordingly no longer counteract any opposing forces.

Figure 12:
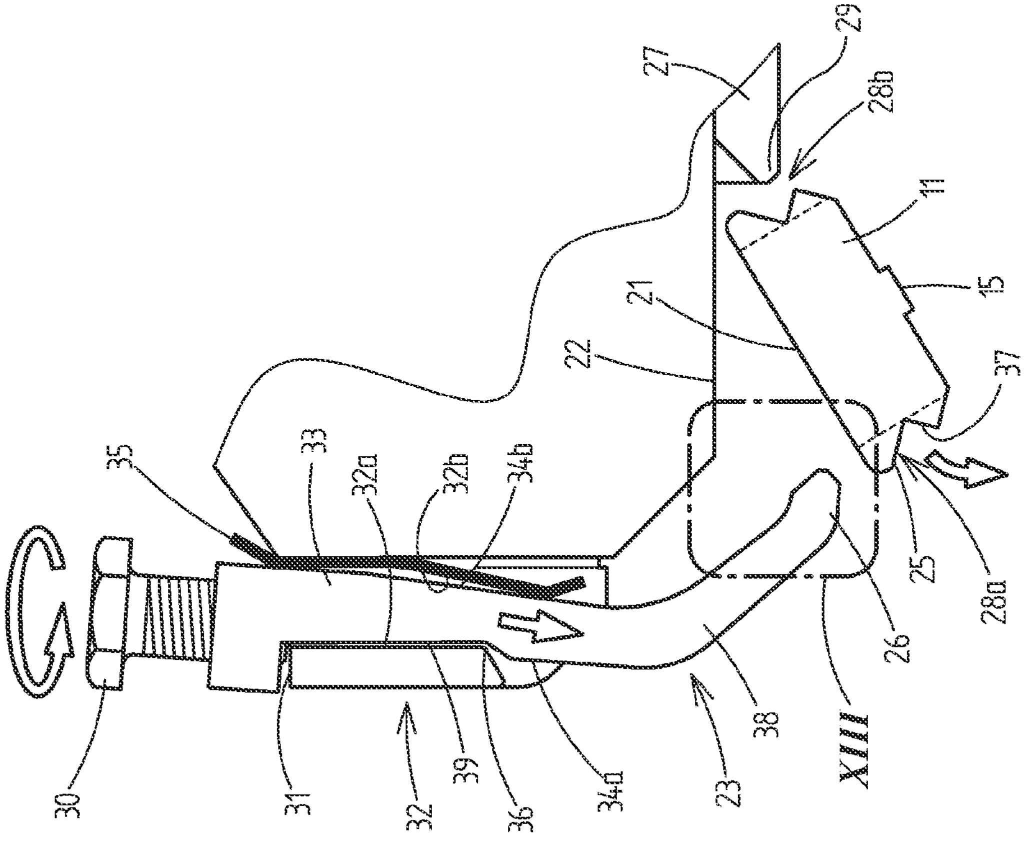
FIG. 12 shows an illustration corresponding to FIG. 10 after a second phase of the movement of the lever from the fastening position into the releasing position, specifically a pivoting movement.

The pivoting movement ends in the releasing position of the lever 23, specifically as soon as the stop region/stop surface 39 of the perpendicular portion 33 butts against the guide surface 32*a*, cf. FIG. 12.

Figure 6:
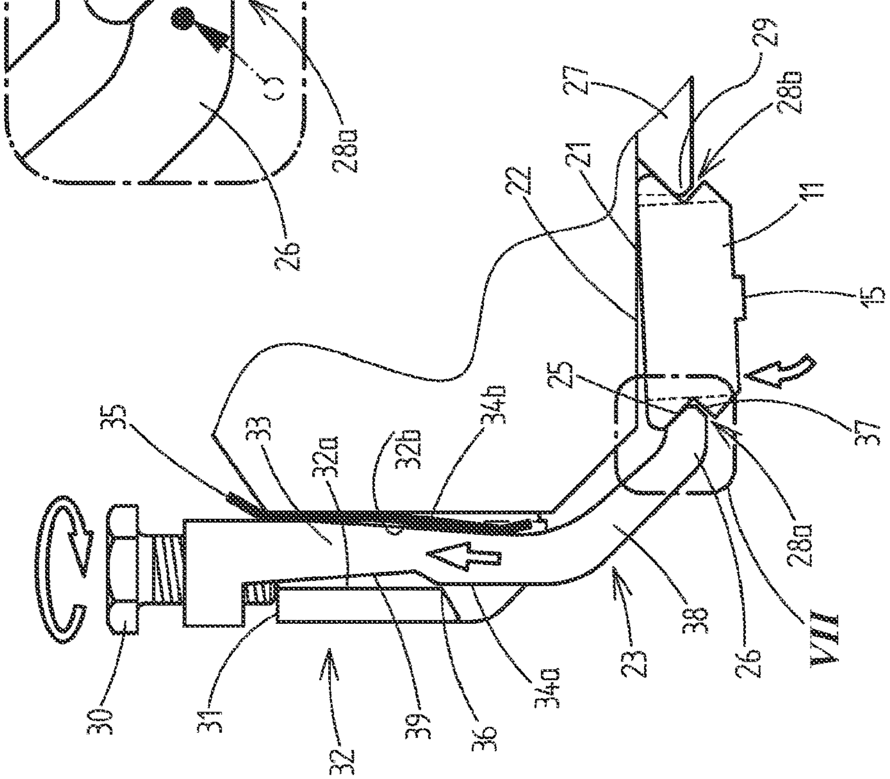
FIG. 6 shows an illustration corresponding to FIG. 5 after a first phase of a (return) movement of the lever from the releasing position into a or the fastening position, specifically a pivoting movement.
Figure 8:
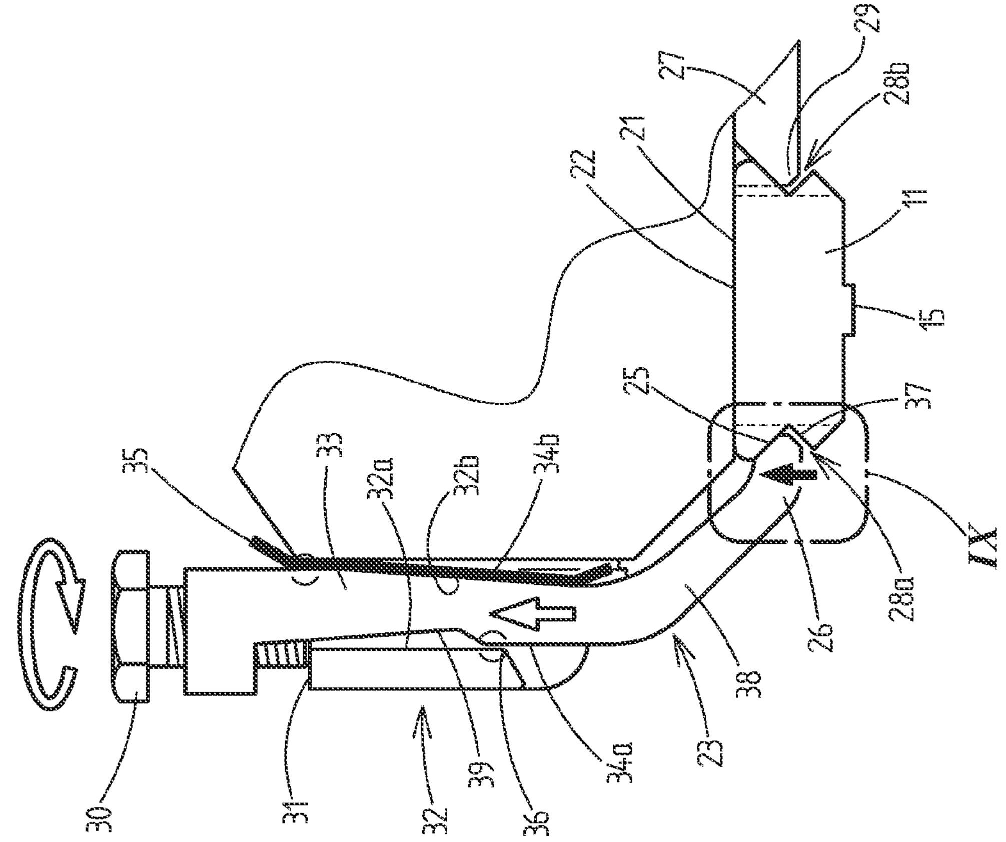
FIG. 8 shows an illustration corresponding to FIG. 6 after a second phase of the (return) movement, following the first phase of the (return) movement, of the lever from the releasing position into a or the fastening position, specifically a straight movement.
Figure 11:
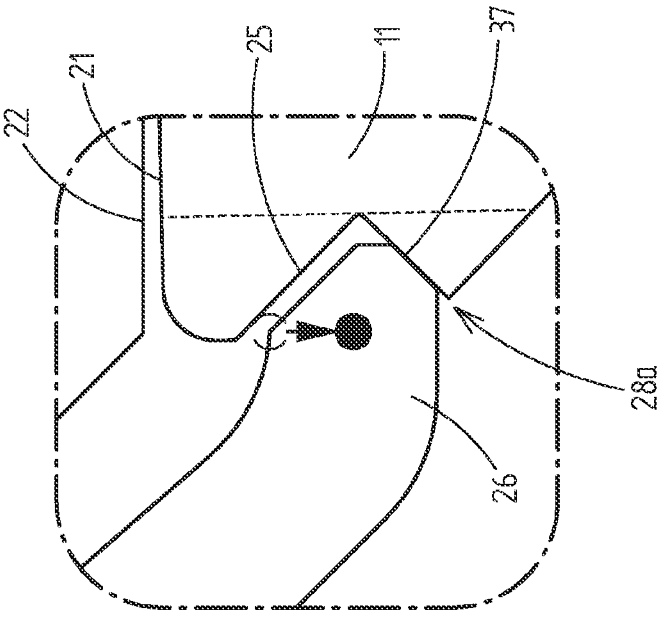
FIG. 11 shows the detail XI from FIG. 10 in an enlarged illustration.

In the case of a corresponding rotary movement of the screw 30 in a direction of rotation opposite to the above-described direction of rotation, the above-described movement phases are passed through in the reverse order and direction, cf. FIGS. 6 and 8.

LIST OF REFERENCE SIGNS

10 Valve arrangement
11 Nozzle part
12 Fastening device
13 Main valve body
14 Valve unit
15 Nozzle opening
16 Medium channel
17 Lower end
18 Inlet opening
19 Outlet opening
20 Nozzle part channel
21 Contact surface
22 Mating surface
23 Lever
24 Pressure surface of lever
25 Clamping surface of nozzle part
26 End portion of lever
27 Counter bearing
28*a* Recess
28*b* Recess
29 Protrusion
23 Tensioning screw
31 Supporting surface
32 Guide
32*a* Guide surface
32*b* Guide surface
33 Perpendicular portion
34*a* First lever guide surface
34*b* Second lever guide surface
35 Spring sheet
36 Free end
37 Push-off surface of nozzle part
38 Oblique portion
39 Stop region
40 Medium feed line

The invention claimed is:

1. A valve arrangement for applying flowable medium to a substrate, having a main valve body (13) with at least one medium channel for flowable media which is able to be closed by a movable closure member and to which at least one nozzle part (11) having a nozzle opening of the valve arrangement is connected, which nozzle part (11) is fastened releasably to the main valve body (13) and via which nozzle part (11) the portions of the flowable medium can be dispensed onto a substrate, wherein the valve arrangement, for releasably fastening the nozzle part (11) to the main valve body (13), has a pivotable lever (23) of a fastening device by means of which pivotable lever (23) the nozzle part (11) is able to pressed against the main valve body (13) in a fastening position by application of a pressing force, wherein the pivotable lever (23) is movable out of the fastening position and into a releasing position, in which it does not exert a pressing force and in which the nozzle part (11) is removable from the main valve body (13), wherein the fastening device and the nozzle part (11) are configured and cooperate in such a way that the pivotable lever (23), during the movement from the fastening position into the releasing position, exerts a detaching force, directed away from the main valve body (13), on the nozzle part (11) in order to support the detachment of the nozzle part (11) from the main valve body (13), wherein, in a first phase of its movement out of the fastening position and into the releasing position, the pivotable lever (23) is movable in a straight line and in the process exerts the detaching force on the nozzle part (11).

2. The valve arrangement as claimed in claim 1, wherein, in the first phase of its movement, the pivotable lever (23) is movable perpendicularly to a plane or the plane in which the nozzle opening of the nozzle part (11) extends before the detaching force is exerted.

3. The valve arrangement as claimed in claim 1, wherein, in a second phase of its movement, the pivotable lever (23) is movable into the releasing position by a pivoting movement.

4. The valve arrangement as claimed in claim 3, wherein the fastening device is in the form of a tensioning device with which the pivotable lever (23), in the fastening position, is able to be pressed under preload—with application of the pressing force—against the nozzle part (11).

5. The valve arrangement as claimed in claim 4, wherein the tensioning device comprises a tensioning screw (30) which is coupled to the pivotable lever (23) and is supported on a supporting face connected to the main valve body (13), wherein a first rotational movement of the tensioning screw (30) brings about the straight movement of the first movement phase of the pivotable lever (23).

6. The valve arrangement as claimed in claim 5, wherein a second rotational movement of the tensioning screw (30) initiates the pivoting movement of the second movement phase of the pivotable lever (23).

7. The valve arrangement as claimed in claim 1, wherein, in the fastening position, the nozzle part (11) is clamped between the pivotable lever (23) and a counter bearing (27), which is positionally fixed and is arranged on the main valve body (13), with the nozzle part (11) being centered such that a medium channel of the nozzle part (11), which leads to the nozzle opening, is aligned with the medium channel of the main valve body (13).

8. The valve arrangement as claimed in claim 1, wherein the nozzle part (11) has a clamping surface (25) which extends obliquely to the vertical and against which the pivotable lever (23) presses in the fastening position in order to transmit the pressing force to the nozzle part (11), and an opposite push-off surface which extends obliquely to the vertical and against which the pivotable lever (23) presses at least temporarily during its movement into the releasing position, in order to transmit the detaching force to the nozzle part (11).

9. The valve arrangement as claimed in claim 1, wherein the nozzle part (11) has a lateral recess or a lateral protrusion, in which, in the fastening position of the pivotable lever (23), a matching protrusion of the pivotable lever (23) engages, or, respectively, which, in the fastening position of the pivotable lever (23), engages in a matching, recess in the pivotable lever (23), wherein the recess or the protrusion of the nozzle part (11) is delimited in the direction of the main valve body (13) or upwardly by the clamping surface (25) and in the opposite direction or downwardly by the push-off surface.

10. The valve arrangement as claimed in claim 1, wherein the counter bearing (27) or the nozzle part (11) has a protrusion which, in the fastening position of the pivotable lever (23), in which the nozzle part (11) is clamped between the pivotable lever (23) and the counter bearing (27), engages in a matching recess in the nozzle part (11) or in the counter bearing (27).

11. The valve arrangement as claimed in claim 1, wherein the pivotable lever (23) has a perpendicular portion (33) which is arranged in a plane that extends perpendicularly to a plane in which the nozzle opening of the nozzle part (11) extends before the detaching force is exerted, and/or an oblique portion (38) which is arranged in a plane that extends obliquely to this plane.

12. The valve arrangement as claimed in claim 11, wherein the oblique portion (38) of the pivotable lever (23) adjoins an end portion, comprising a free end, of the pivotable lever (23), which presses against the clamping surface (25) of the nozzle part (11) in the fastening position and which presses temporarily against the push-off surface of the nozzle part (11) during the movement of the pivotable lever (23) into the releasing position.

13. The valve arrangement as claimed in claim 1, wherein the pivotable lever (23) is guided laterally against a guide (32) of the valve arrangement during the straight movement of the first movement phase.

14. The valve arrangement as claimed in claim 13, wherein the guide (32) has a first guide surface against which a first lever guide surface, which is assigned to a first side of the perpendicular portion (33) of the pivotable lever (23), is guided during the straight movement, brought about by the first rotational movement of the tensioning screw (30), of the first movement phase.

15. The valve arrangement as claimed in claim 14, wherein the guide (32) has a second guide surface which is formed by the spring, in the form of a spring sheet (35), of the fastening device, against which a second lever guide surface, which is assigned to a second side of the perpendicular portion (33) of the pivotable lever (23), is guided during the straight movement, brought about by the first rotational movement of the tensioning screw (30), of the first movement phase, and the restoring forces of which in the process act on the second lever guide surface and as a result press the first lever guide surface against the first guide surface of the guide (32).

16. The valve arrangement as claimed in claim 15, wherein, during the second rotational movement of the tensioning screw (30), the first lever guide surface is moved out beyond one end of the first guide surface of the guide (32), such that the first lever guide surface is no longer pressed against the first guide surface of the guide, and such that the restoring forces, acting on the second lever guide surface, of the spring sheet (35) bring about the pivoting movement of the second movement phase of the pivotable lever (23).

17. The valve arrangement as claimed in claim 16, wherein the perpendicular portion (33) of the pivotable lever (23) has a stop surface which is assigned to the first side of the perpendicular portion (33) and is set back laterally with respect to the first lever guide surface, said stop surface butting against a guide surface of the guide (32).

18. The valve arrangement as claimed in claim 1, wherein the fastening device presses the pivotable lever (23), in the fastening position, against the nozzle part (11) with specific elastic deformation of the pivotable lever (23) with preload, such that, on account of the preload of the pivotable lever (23), the pressing force remains substantially the same, or differs from the initial pressing force by no more than 20% even in the case of temperature-related, different expansion of the materials of the pivotable lever (23), of the nozzle part (11) and/or of the main valve body (13) and thus otherwise associated easing of the pressing force.

19. The valve arrangement as claimed in claim 1, wherein the pivotable lever (23) exerts the detaching force on a push-off surface of the nozzle part (11).

20. The valve arrangement as claimed in claim 1, wherein the pivotable lever (23) is guided laterally against a guide (32) which is arranged above the nozzle part (11) and/or against a side of the main valve body (13) which is arranged in a plane that extends perpendicularly to a plane in which the nozzle opening of the nozzle part (11) extends before the detaching force is exerted.

* * * * *